US008392075B2

(12) United States Patent
Mindeman et al.

(10) Patent No.: US 8,392,075 B2
(45) Date of Patent: Mar. 5, 2013

(54) CARRIER AND BACKHOE CONTROL SYSTEM AND METHOD

(75) Inventors: Spencer L. Mindeman, West Fargo, ND (US); Doran D. Hirschkorn, Bismarck, ND (US); Christopher W. Lougheed, Litchfield, MN (US); Phillip D. Bogner, Bismarck, ND (US); Alvin A. Liebel, Mandan, ND (US)

(73) Assignee: Clark Equipment Company, West Fargo, ND (US)

( * ) Notice: Subject to any disclaimer, the term of this patent is extended or adjusted under 35 U.S.C. 154(b) by 378 days.

(21) Appl. No.: 12/391,777

(22) Filed: Feb. 24, 2009

(65) Prior Publication Data

US 2009/0216412 A1 Aug. 27, 2009

Related U.S. Application Data

(60) Provisional application No. 61/031,121, filed on Feb. 25, 2008.

(51) Int. Cl.
*G06F 7/70* (2006.01)
(52) U.S. Cl. ........................................................ 701/50
(58) Field of Classification Search ................ 701/50
See application file for complete search history.

(56) References Cited

U.S. PATENT DOCUMENTS

| 3,585,319 | A | * | 6/1971 | Payerle et al. ................ 200/6 A |
| 5,002,454 | A | * | 3/1991 | Hadank et al. ............ 414/695.5 |
| 5,713,419 | A | | 2/1998 | Kaczmarski et al. |
| 5,957,213 | A | | 9/1999 | Loraas et al. |
| 6,009,354 | A | | 12/1999 | Flamme et al. |
| 6,030,169 | A | | 2/2000 | Rossow et al. |
| 6,061,617 | A | | 5/2000 | Berger et al. |
| 6,119,054 | A | | 9/2000 | Miki et al. |
| 6,167,337 | A | | 12/2000 | Haack et al. |

(Continued)

FOREIGN PATENT DOCUMENTS

| EP | 1 538 267 A1 | 6/2005 |
| WO | 01/57324 A1 | 8/2001 |

OTHER PUBLICATIONS

Search Report & Written Opinion dated Jun. 10, 2009 for International application No. PCT/US2009/001171, filed on Jun. 10, 2009.

(Continued)

*Primary Examiner* — Thomas B Will
*Assistant Examiner* — Joel F. Mitchell
(74) *Attorney, Agent, or Firm* — John D. Veldhuis-Kroeze; Westman, Champlin & Kelly, P.A.

(57) ABSTRACT

A power machine includes a carrier comprising a supporting frame, an operator compartment and a joystick controller disposed in the operator compartment and configured to generate movement signals in response to operator movement of the joystick controller. An attachment is detachably coupled to the power machine. A carrier control unit is disposed on the carrier and configured to receive the movement signals from the joystick controller. An attachment control unit is disposed on the attachment and configured to control movement of the attachment. A network is coupled to the carrier control unit and to the attachment control unit and is configured to carry instructions from the carrier control unit to the attachment control unit. A state selection input is disposed in the operator compartment to select one of at least two operational states including a carrier state and an attachment state. In the carrier state, the carrier control unit is configured to control operation of the carrier in response to operator movement of the joystick controller. In the attachment state, the attachment control unit is configured to control operation of the attachment in response to operator movement of the joystick controller.

20 Claims, 3 Drawing Sheets

U.S. PATENT DOCUMENTS

| | | |
|---|---|---|
| 6,354,023 B1 | 3/2002 | Trahan et al. |
| 6,522,964 B1 | 2/2003 | Miki et al. |
| 6,542,789 B2 | 4/2003 | Ufheil |
| 6,643,577 B1 | 11/2003 | Padgett et al. |
| 6,665,601 B1 | 12/2003 | Nielsen |
| 6,757,994 B1 | 7/2004 | Hendron |
| 6,854,554 B2 | 2/2005 | Brandt et al. |
| 6,923,285 B1 | 8/2005 | Rossow et al. |
| 6,928,353 B2 | 8/2005 | Finley et al. |
| 6,935,434 B1 | 8/2005 | Easton et al. |
| 7,010,367 B2 | 3/2006 | Koch et al. |
| 7,099,722 B2 | 8/2006 | Casey |
| 7,142,968 B2 | 11/2006 | Alexander et al. |
| 7,210,291 B2 | 5/2007 | Pfaff |
| 7,233,853 B2 | 6/2007 | Hendron et al. |
| 7,342,486 B2 * | 3/2008 | Tsukada et al. ............... 340/438 |
| 2002/0117017 A1 * | 8/2002 | Bernhardt et al. ....... 74/471 XY |
| 2005/0283295 A1 | 12/2005 | Normann |
| 2006/0021819 A1 | 2/2006 | Shearer et al. |
| 2006/0095186 A1 * | 5/2006 | Hendron et al. ................ 701/50 |
| 2006/0229769 A1 | 10/2006 | Grichnik et al. |
| 2006/0241837 A1 | 10/2006 | Jarrett et al. |
| 2006/0241838 A1 | 10/2006 | Mongiardo et al. |
| 2006/0287792 A1 | 12/2006 | Jarrett |
| 2007/0168100 A1 | 7/2007 | Danko |
| 2007/0173999 A1 | 7/2007 | Shinozaki et al. |
| 2008/0083570 A1 * | 4/2008 | Bares et al. .................. 180/6.48 |

OTHER PUBLICATIONS

Official Communication dated Oct. 4, 2010 for European Patent Application No. 09714583.3-1239, based on PCT/US2009/001171.
Communication dated May 21, 2012 in Chinese application No. 200980106238.X, filed Feb. 2, 2009, with English translation attached, 14 pages.

* cited by examiner

CARRIER AND BACKHOE CONTROL SYSTEM AND METHOD

CROSS-REFERENCE TO RELATED APPLICATION

The present application is based on and claims the benefit of U.S. provisional patent application Ser. No. 61/031,121, filed Feb. 25, 2008, the content of which is hereby incorporated by reference in its entirety.

FIELD OF THE INVENTION

Embodiments of the invention generally relate to power machines, and more specifically, to a control system for use with power machines.

BACKGROUND OF THE INVENTION

Power machines, such as skid steer loaders, typically include one or more machine controllers that control the power machines in response to physical inputs from an operator. The machine controllers can include, for example, a carrier controller and an attachment controller. For control of many types of attachments, for instance a backhoe attachment for a skid steer loader or other type of power machine carrier, separate sets of operator controls are used to control the carrier (power machine) and the attachment.

In some conventional power machines with backhoe (or other) type attachments, a second set of controls for the backhoe (or other attachment) are positioned outside of the operator compartment. In still other conventional power machines, a second set of controls for the backhoe (or other attachment) are provided in the operator compartment by entering the second set of controls through the front operator entry. This does not allow for enclosed cab operation, resulting in little if any climate control of the immediate operator area. This can also drastically reduce work area visibility due to the control system positioning.

SUMMARY OF THE INVENTION

A power machine can have a frame to support a compartment and a movable arm to support an attachment such as a bucket. The movable arm is generally pivotally coupled to the frame with actuators, such as hydraulic cylinders. When an operator operates a power machine, the operator actuates the actuators. In response to the actuated actuators, the movable arm moves.

When the operator causes the actuators to actuate, commands are sent from a controller in the power machine to the attachment. The commands are generally signals that conform to some communication protocols. To securely operate a power machine, the power machine provides a communication system for the power machine that encrypts messages generated by a controller on the power machine and sends the encrypted messages to a controller of an attachment. The messages can be control-area-network (CAN) format messages communicated over a network, such as a CAN bus. Particularly, the system also includes a key (e.g., a "softkey") that is configurable to switch between a carrier state, an attachment state, and a hybrid state.

In one embodiment, the invention provides a control system that operates an attachment, such as a backhoe, using controls available in a carrier. The control system allows an operator to use the attachment from inside a protective area of a cab with all cab enclosures installed, provides interaction between the carrier and the attachment, and increases user adjustability of functions available by the attachment.

In one embodiment, the invention provides a control system for controlling an attachment attached to a carrier. Both the carrier and the attachment include respective controllers. The carrier relays operational data and/or instructions from the carrier controller to the attachment controller via a network, such as a control-area-network ("CAN") bus. Other networks can also be used, for example wireless networks. For example, when an operator moves one or more joysticks and/or switches associated therewith, information or signals indicative of movements and switch positions on the one or more joysticks is placed on the CAN bus or other network. When the attachment is selected, the attachment controller receives the information or signals, interacts with the carrier controller, and performs functions accordingly. In this way, not only do the one or more joysticks control and operate the carrier, the one or more joysticks can also control and operate a set of predetermined attachment functions.

In another embodiment the invention provides a control system for a carrier configured to be removably coupled to one of a variety of attachments. The carrier includes a user-interface configured to switch between a plurality of states, a joystick configured to generate movement signals, and a carrier controller. The carrier controller is configured to receive the movement signals operable to control the carrier based on at least one of the user interface states, and to communicate the movement signals, via a control-area-network, bus to an attachment controller of the attachment based on at least another one of the user-interface states operable to control the attachment.

In another embodiment, the invention provides a control system for use with a power machine and an attachment detachably coupled to the power machine. The system includes one or more joysticks, a first control unit, a network such as a control-area-network ("CAN") bus, a softkey, and a second control unit. The softkey has a carrier state, an attachment state, and a hybrid state. The one or more joysticks generate movement signals in response to their movement. The first control unit is configured to receive the movement signals operable to control the carrier when the softkey is in the carrier state. The first control unit is coupled to the power machine, and generates operating messages based on the movement signals. The control-area-network is coupled to the first control unit, and configured to carry the operating messages. The second control unit is positioned in the attachment, and coupled to the control area network. The second control unit receives the operating messages from the one or more joysticks when the softkey is in the attachment state. The first and second control units communicate with the joysticks and control both the carrier and the attachment when the softkey is the hybrid state.

Other aspects of the invention will become apparent by consideration of the detailed description and accompanying drawings.

DETAILED DESCRIPTION OF ILLUSTRATIVE EMBODIMENTS

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As should also be apparent to one of ordinary skill in the art, the systems shown in the figures are models of what actual systems might be like. As noted, many of the modules and logical structures described are capable of being implemented in software executed by a microprocessor or a similar device or of being implemented in hardware using a variety of components including, for example, application specific integrated circuits ("ASICs"). Terms like "processor" and "controller" may include or refer to hardware and/or software. While a control-area-network (CAN) bus is shown as an example of a communication network in the following embodiments, these embodiments can also utilize other networks, such as a wireless network. Thus, the claims should not be limited to the specific examples or terminology or to any specific hardware or software implementation or combination of software or hardware.

Furthermore, although the illustrated embodiment contemplates application of the invention to a skid loader, the invention may be applied to other power machines.

Figure 1:
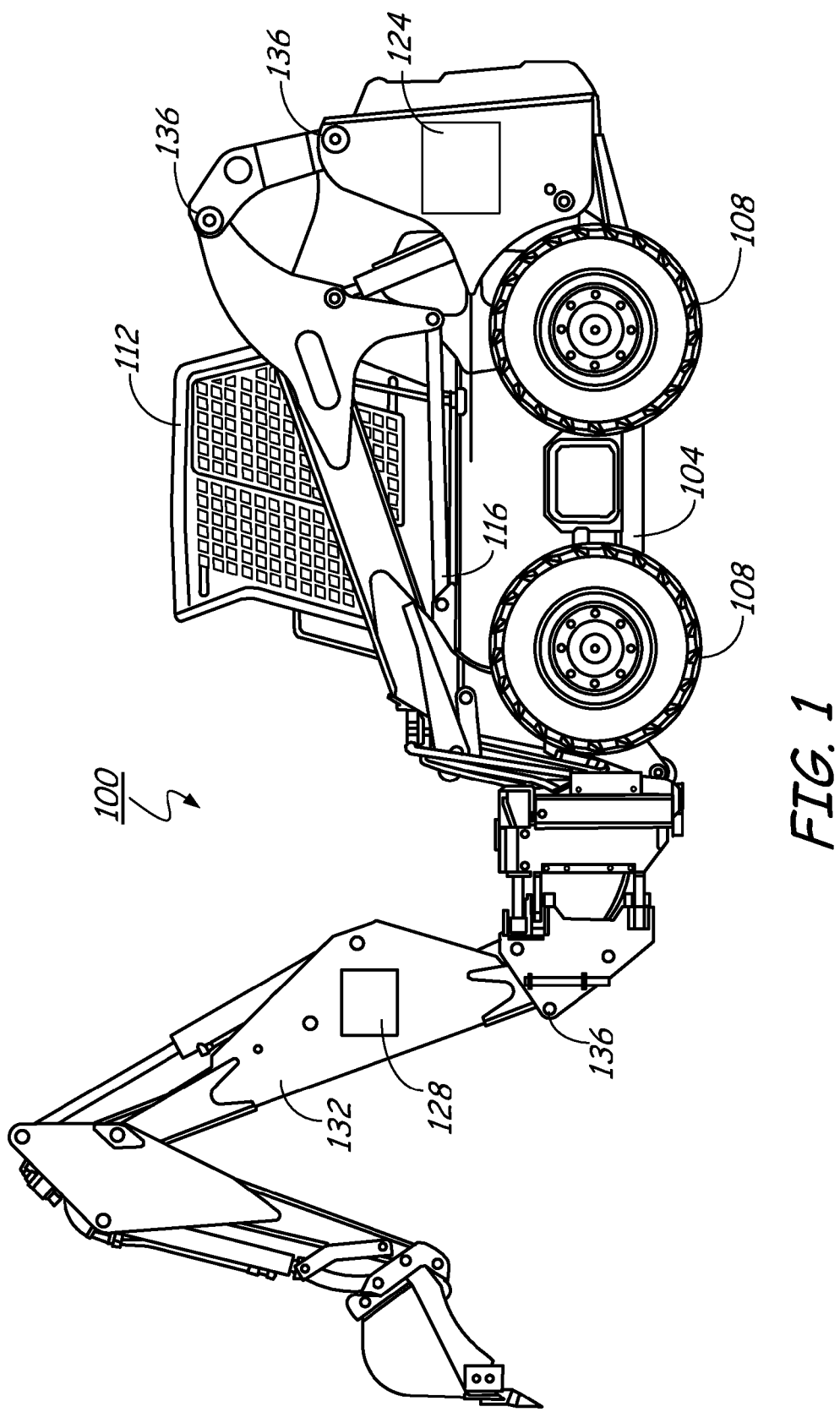
FIG. 1 is a side view of a power machine.

FIG. 1 is a side view of a power machine 100 such as a skid loader. The power machine 100 includes a supporting frame or main frame 104 and wheels 108 to drive the power machine 100 with an internal combustion engine. The supporting frame 104 also includes an operator compartment 112 in which an operator operates the power machine 100. The operator compartment 112 typically includes a seat, a seat bar, and operating devices such as one or more hand grips or joysticks, instrument cluster, instrument displays, other display panels, other input panels, levers, foot pedals, and the like. For example, an operator can maneuver the joysticks in a certain way, which in turn, actuates one or more actuators 116, such as hydraulic cylinders. Although one actuator 116 is shown, it should be understood that the power machine 100 includes other actuators. It is also noted that, in some cases, an operator can operate the power machine 100 remotely and/or wirelessly.

Particularly, when an operator moves an operating device, such as hand grips, sensors of the operating device generate a plurality of data indicative of a movement or a change in parameter of the operating devices. A host-processor or host-controller in a controlling unit 124 of the power machine 100 receives the data, and generates a set of corresponding operating or actuating instructions or messages. A control-area-network ("CAN") controller receives the messages, formats the messages into a CAN format, and transmits the formatted messages through a CAN bus serially, detailed hereinafter.

Although the illustrated embodiment shows a generic location of the controlling unit 124, it should be noted that the controlling unit 124 can be located in other locations of the power machine 100. Furthermore, each of the operating devices can include a host-processor that communicates with a corresponding host-CAN controller. In other embodiments, the host-controller transmits the messages to the CAN controller for further processing as discussed.

A second controlling unit 128 receives the formatted messages through a CAN bus. Particularly, a transceiver receives the messages, and transmits the received messages to a corresponding CAN controller. The CAN controller then transmits the received messages to a second host-controller. The second host-controller then actuates devices in response to the messages from the CAN controller. As discussed earlier, the CAN controller can receive and retransmit the received messages to the second host-controller for further processing. After the second controlling unit 128 has received some operating instructions, the second controlling unit 128 actuates a corresponding device, such as a movable lift arm 132 that is pivotally coupled to the supporting frame 104 at pivot points 136. The movable lift arm 132 then moves an attachment in response to the received messages. Moveable lift arm 132, in this example, represents the backhoe attachment. In addition to the backhoe attachment, other exemplary corresponding devices include attachments, such as a backhoe, the actuators 116, and the like. Communications between the first and second controlling units 124, 128 are generally bi-directional. For example, the second controlling unit 128 can also transmit encrypted CAN messages to the first controlling unit 124.

Figure 2:
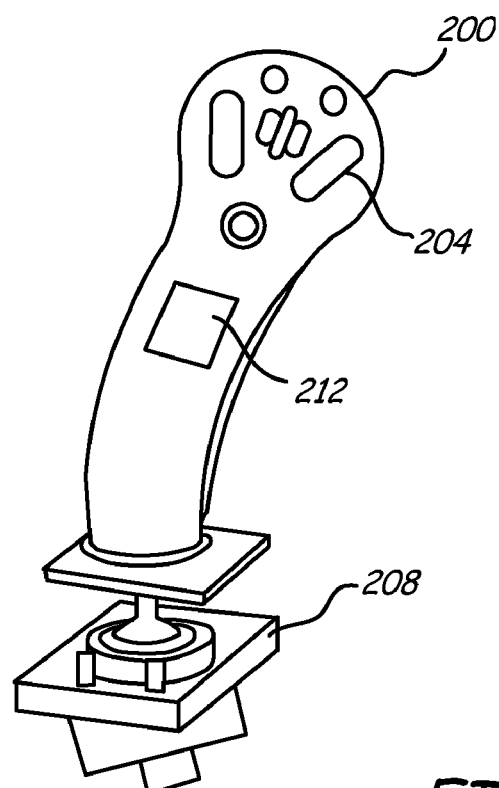
FIG. 2 is a side view of a joystick for use with the power machine of FIG. 1.

FIG. 2 is a joystick 200 for use with the power machine of FIG. 1. The joystick 200 has a plurality of buttons 204 that controls a plurality of functions of the power machine 100 and/or the attachment, such as, as a backhoe. When an operator moves the joystick 200 with respect to an assembly base 208, a joystick controller 212 translates positions, motions, and/or movements detected by one or more motion sensors therein into CAN formatted signals, and transmits the signals and/or other information to the CAN bus for further processing. In some embodiments, the joystick 200 is a commercially available joystick system, such as, for example, PROF 1 from the Sauer Company.

In some embodiments, information transmitted from the joystick 200 includes control position information for the power machine 100. The control position information informs the attachment controller, such as the backhoe attachment controller, of a position of the joystick 200. The position information can be used to operate designated functions on the attachment, such as the backhoe, in a proportional manner.

When the buttons 204 are depressed, information transmitted from the joystick 200 includes attachment functional instructions. For example, the information informs the attachment, such as the backhoe, which of the buttons 204 has been pressed, selected, or switched on the joystick 200. In the case of a backhoe attachment, for example, depending on the buttons 204 selected, the backhoe will operate and/or perform one or more functions, including flat bottom digging, autonomous or automatic digging (such as repositioning of the carrier, auto return to dig, auto dump), maximum backhoe height (in height restrictive environments), maximum dig depth, maximum backhoe and backhoe attachment reach, automatic workgroup leveling (primarily arm and interface), and the like.

In some embodiments, the power machine controller can provide optional carrier information to the attachment controller to evaluate hydraulic flow control algorithms. Information of this type to be conveyed includes carrier serial number, high flow hydraulic, fully variable flow hydraulics, engine RPM control, and the like.

Figure 3:
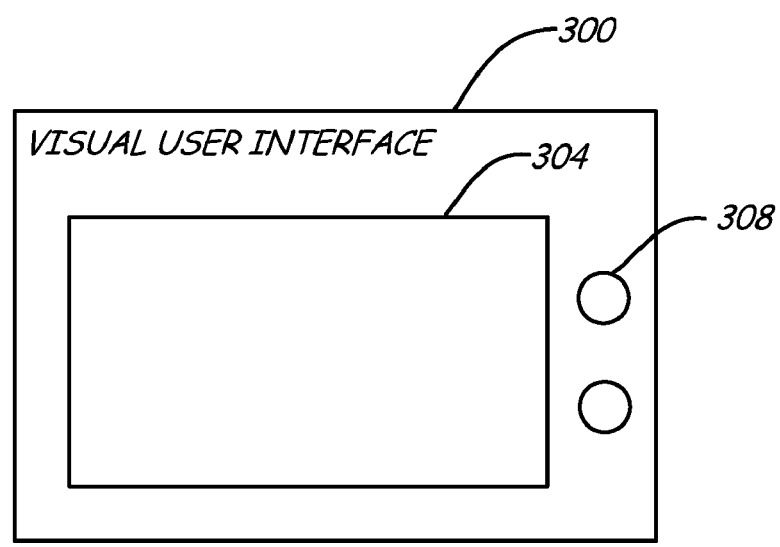
FIG. 3 is a representation of a visual user interface for use with the power machine of FIG. 1

The power machine also includes a visual user interface 300 as shown in FIG. 3. The interface 300 includes a display panel 304, such as a dot matrix display panel, configured to selectively display statuses or other information of the power machine 100 and/or the attachment. For example, the interface 300 also includes a plurality of softkeys 308 for an operator to select a particular status to be displayed, and to select a particular device to be controlled via the joysticks 200. In some embodiments, the visual user interface 300 is integral to the attachment carrier. In some embodiments, information displayed on the display panel 304 regarding backhoe functions and control modes is stored on the attachment controller. The information stored includes control mode layout, such as ISO and standard; backhoe auxiliary operations; backhoe auxiliary maximum flow and maximum pressure settings; functional control mode such as backhoe and hybrid (carrier drive and backhoe workgroup); and the like. The softkeys 308 on the side of the display panel 304 can be used to convey other information to the backhoe controller.

In some embodiments, the attachment controller, such as a backhoe controller, can evaluate hydraulic flow requirements to perform functions that an operator has requested. Dependent on the carrier, the backhoe controller can activate high flow hydraulics on the carrier, adjust proportional carrier hydraulic flow, or adjust carrier engine RPM with an end result of obtaining a required hydraulic flow to perform the requested functions while maintaining maximum carrier fuel efficiency.

Figure 4:
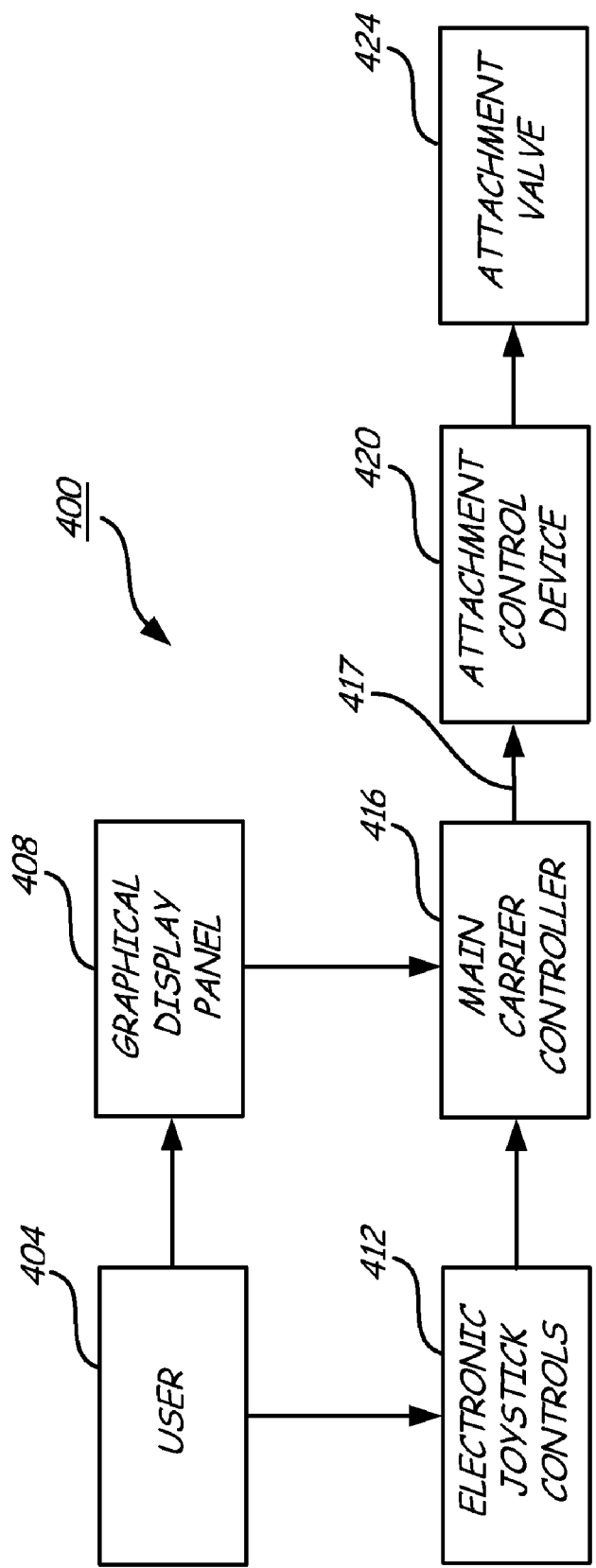
FIG. 4 is a control diagram representing a use of the power machine of FIG. 1.

FIG. 4 is a control flow diagram 400 for use with the power machine of FIG. 1. For example, a user 404 through a graphical display panel 408, such as the panel 300 of FIG. 3, selects to control, via a joystick control 412, such as the joystick 200, the power machine 100 and/or the attachment. Once a selection has been made, information flows from a carrier controller 416, via the CAN bus or other network 417, to an attachment controller 420 and subsequently to an exemplary device, such as an attachment valve 424.

Although the present invention has been described with reference to preferred embodiments, workers skilled in the art will recognize that changes may be made in form and detail without departing from the spirit and scope of the invention.

What is claimed is:

1. A power machine capable of being detachably coupled to an attachment comprising:
   a frame, an operator compartment supported by the frame, and a joystick controller disposed in the operator compartment, the joystick controller configured to generate movement signals in response to operator movement of the joystick controller;
   an electronic machine control unit configured to receive the movement signals from the joystick controller and control machine functions;
   a serial communication network coupled to the electronic machine control unit and configured to be coupled and communicate with an electronic attachment control unit that is disposed on the attachment and is configured to control movement of the attachment; and
   a state selection input disposed in the operator compartment to select one of at least two operational states including a first operating state and a second operating state, wherein the electronic machine control unit is configured to control operation of machine functions in response to the movement signals while in the first operating state, and wherein the electronic machine control unit is configured to allow the electronic attachment control unit to control operation of the attachment, in response to the movement signals while in the second operating state, by refraining from controlling operation of machine functions in response to movement signals that would cause the electronic machine control unit to control operation of machine functions in the first operating state so that the electronic attachment control unit is free to control the attachment in response to the movement signals while in the second operating state;
   wherein the power machine is capable of being in electrical communication with the electronic attachment control unit so that the electronic attachment control unit can receive the movement signals from the joystick controller via the serial communication network.

2. The power machine of claim 1, wherein the state selection input further comprises a display configured to selectively display status information of one of the power machine and the attachment.

3. The power machine of claim 2, wherein the state selection input further comprises a key input configured to allow the operator to select the one of the at least two operational states.

4. The power machine of claim 3, wherein the at least two operational states further include a third operating state in which the electronic machine control unit controls drive functions and wherein the electronic machine control unit is configured to allow the electronic attachment control unit to control operation of the attachment both in response to the movement signals.

5. The power machine of claim 3, wherein the power machine comprises a skid steer loader.

6. The power machine of claim 1, wherein the network comprises a controller-area-network (CAN) bus coupled to the electronic machine control unit and to the electronic attachment control unit.

7. A power machine having a supporting frame, at least one hydraulically controlled function, and an operator compartment in combination with a removable attachment, comprising:
   an input control device disposed in the operator compartment and configured to generate movement signals in response to operator movement of the input control device;
   a first electronic control unit disposed on the power machine and configured to receive the movement signals from the input control device;
   a second electronic control unit disposed on the attachment and configured to receive the movement signals from the input control device and control movement of the attachment based on the movement signals;
   an actuation device disposed on the attachment remotely from the second electronic control unit and configured to receive electronic control signals from the second electronic control unit for controlling the actuation device;
   a serial communication network coupled to the first and second electronic control units configured to carry instructions between the first and second control units; and
   a state selection input disposed in the operator compartment to select one of at least two operational states including a first operating state and a second operating state, the first electronic control unit configured to control operation of the power machine in response to the movement signals while in the first operating state, and the second electronic control unit configured to control operation of the attachment in response to the movement signals while in the second operating state.

8. The combination of claim 7, wherein the input control device comprises a joystick controller.

9. The combination of claim 7, wherein the state selection input further comprises a display panel configured to selectively display status information of at least one of the power machine and the attachment.

10. The combination of claim 9, wherein the state selection input further comprises a key input configured to allow an operator to select one of the at least two operational states.

11. The combination of claim 10, wherein the first electronic control unit is configured such that, when in the second operating state, instruction data is transmitted from the first electronic control unit to the second electronic control unit to control operation of the attachment in response to the movement signals.

12. The combination of claim 11, wherein the key input comprises at least one softkey on the display panel.

13. The combination of claim 11, wherein the at least two operational states further include a third operating state in which the first electronic control unit controls drive functions of the power machine and the second electronic control unit controls functions of the attachment, both in response to the movement signals.

14. The combination of claim 7, where in the network comprises a controller area network (CAN) bus coupled to the first electronic control unit and to the second electronic control unit.

15. The combination of claim 7, wherein the power machine is a skid steer loader.

16. The combination of claim 7, wherein the attachment is a backhoe.

17. An implement configured to be coupled to a power machine having a frame, an operator compartment supported by the frame, and a joystick controller disposed in the operator compartment, the joystick controller configured to generate movement signals in response to operator movement of the joystick controller; an electronic machine control unit configured to receive the movement signals from the joystick controller, the implement comprising:
  at least one actuable device;
  an electronic implement control unit configured to be placed in communication via a serial communication network with the electronic machine control unit and capable of providing control signals to the at least one actuable device; and
  wherein the electronic implement control unit is configured to operate in a plurality of operating states, including a first operating state and a second operating state, wherein the electronic implement control unit is configured to control the at least one actuable device in response to given movement signals when the second operating state is active and refrain from controlling the at least one actuable device in response to the given movement signals when the first operating state is active so as to allow the electronic machine control unit to control the power machine in response to the movement signals.

18. The implement of claim 17, wherein the electronic implement control unit is configured to receive an indication from the power machine that indicates which of the plurality of operating states is active.

19. The implement of claim 18, wherein the electronic machine control unit is configured to receive an indication of which of the plurality of operating states is active and wherein the electronic machine control unit is configured to control machine functions in response to the given movement signals when the first operating state is active and to refrain from controlling machine functions when the second operating state is active.

20. The implement of claim 19, wherein the plurality of operating states includes a third operating state, wherein the given movement signals includes first signals and second signals and wherein, when the third operating state is active, the electronic machine control unit is configured to control machine functions in response to the first signals and the electronic implement control unit is configured to control the at least one actuable device in response to the second signals.

* * * * *